Figure 2:
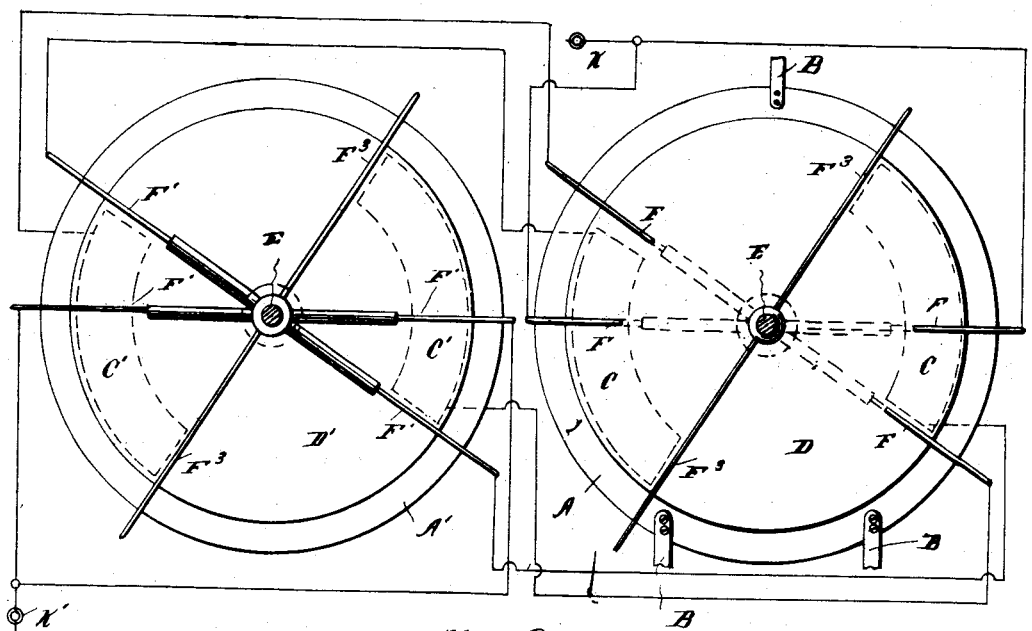

No. 681,763. Patented Sept. 3, 1901.
R. V. WAGNER.
ART OF DEVELOPING STATIC ELECTRICITY.
(Application filed Mar. 7, 1901.)
(No Model.)

Witnesses
Chas. K. Davies,
Paul McFarland

Inventor
R. V. Wagner
By W. H. Bartlett
Attorney

THE NORRIS PETERS CO., PHOTO-LITHO., WASHINGTON, D. C.

UNITED STATES PATENT OFFICE.

ROME V. WAGNER, OF CHICAGO, ILLINOIS.

ART OF DEVELOPING STATIC ELECTRICITY.

SPECIFICATION forming part of Letters Patent No. 681,763, dated September 3, 1901.

Application filed March 7, 1901. Serial No. 50,244. (No specimens.)

*To all whom it may concern:*

Be it known that I, ROME V. WAGNER, residing at Chicago, in the county of Cook and State of Illinois, have invented certain new and useful Improvements in the Art of Developing Static Electricity, of which the following is a specification, reference being had therein to the accompanying drawings.

This invention relates to an improvement in the art of developing static electricity.

The objects of the invention are to produce electricity of the same polarity from the entire face or from the operative portion of the face of a plate, cylinder, or moving surface instead of producing both positive and negative charges from the operative portions of the same plate, cylinder, or surface, as by methods well known; also, to make available as large surfaces or areas as may be desired of the plate or cylinder acted on inductively, thereby increasing the generating capacity of machines, and also from a plurality of plates, cylinders, or surfaces to produce static electricity of opposite polarity.

In static machines, which are usually made with a plate or disk of glass, mica, hard rubber, or other non-conductor of electricity arranged to revolve in proximity to inductors, usually arranged as couples, the rotation of the plate past the positive inductor produces by induction a negative development of static electricity on the face of the plate. The movement past the negative inductor produces a positive development on the same face of the same plate.

The plates, whether disks or cylinders, have always, so far as I am aware, produced both a positive and a negative development of electricity—that is, a part of the surface of each plate is positive and a part of the surface of the same plate is negative—when the development of electricity is by induction by the surface of the plate or cylinder moving near inductors of opposite polarity. Thus a disk machine which develops positive electricity at one side of its axis and negative electricity at the other side of its axis must have a collecting-brush close to each field of development to carry away the developed electricity, lest it be carried around and neutralized, and to prevent a partial neutralization there are usually brushes or collectors at about the extreme of the operative areas of the plate, these being wired together across the face or back of the machine and operating to neutralize the electricity which would otherwise be carried around to neutralize the charge on the other side of the axis of the plate.

It is manifest that where a revolving plate develops positive electricity on one side of its axis and negative electricity at the other side of said axis there must be neutral spaces between and that considerably less than the entire surface of the plate is utilized; also, that where there is rapid change of the same surface area of the plate from positive to negative there is likely to be a difference in the character, as well the quantity, of electrical development and that there is loss of energy in changing from one polarity to the other.

I will now illustrate a machine in which my improvement may be employed.

Figure 1:
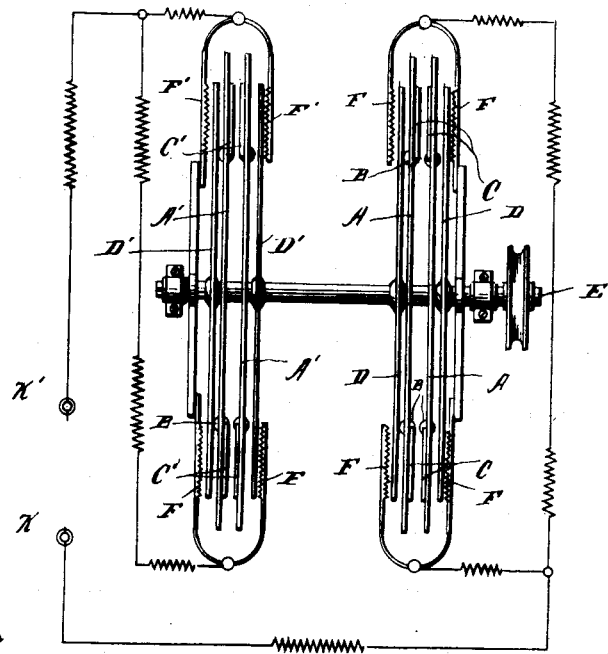

Figure 1 is a plan view of a machine capable of carrying out my method of electrical development. Fig. 2 is a section showing the machine in two halves or parts, as it may be constructed, so as to give a face view of both the positive and the negative disks.

The machine illustrated is in general the usual duplicate machine having two disks at opposite sides of two fixed plates carrying inductors; but the duplication is a matter of convenience. There may be one plate A, one disk D, one plate A', and one plate D'. The differences from the usual machine are in the connections and the manner of charging the inductors, as will be explained.

Let A and A' indicate the ordinary fixed plates of a static machine, which plates are usually of glass, mica, or other electrical non-conductor and are supported from any usual frame by insulators B. The backs of these plates have inductors or blocks C C', of gilt paper, tin-foil, or foil and paper, as common in static machines.

Let D and D' indicate revolving plates of mica, glass, or other good non-conductor of electricity. These plates are carried by the shaft E, so as to revolve with their flat faces near the plates A A' and with strata of air between.

F F, &c., indicate collecting combs or brushes which are in proximity to the faces of disks D. All these combs are connected to the terminal K by suitable wires or other conductors.

F F' indicate collecting-brushes which are connected to the terminal K'.

The inductors C are first charged with electricity of similar character—let us say in the example negatively. Then when put in motion the disks D will be charged positively by induction, and the collectors F will convey positive electricity to the terminal K. The inductors C' are first charged positively. Then the disks D' will be charged negatively and will convey negative electricity to the terminal K', when the disks are rotated by the rotation of shaft E. The inductors C' may be as numerous as desirable, but all must be charged initially with electricity of the same polarity. To maintain the operation of the development in the example given, one or more brushes from the vicinity of the positive disks are connected to the inductors C' and one or more of the brushes F' are connected to inductors C. The brushes $F^3$, which are the neutralizing or equalizing brushes of the ordinary machine, become inert as equalizers, but may serve to decrease internal resistance of the machine. The brushes F may be arranged at any point near the face of plate D, and such brushes will collect electricity or energy of the same polarity, and the converse is true of brushes F' with relation to plate D'. Of course the initial charges of the inductors may be reversed, when the development of electrical energy will be inverse to that described; but all inductors near one plate must be charged with electricity of one polarity. The result of the improvement is that when the plates are rotated each of the disks D—as many in number as may be desired—continually develops energy of the same kind and without a reverse of polarity, and the same is true of the other disks or plates D'. It is not necessary that the inductors C C' should be charged from the moving plate of the opposite couple. The inductors generally receive the initial charge from some other source of energy, as a Leyden jar, although they may be charged by means of frictional electricity developed by rubbing action. The machine illustrated is merely an example. The principle of operation applies to all static machines.

I claim—

1. The method of developing electrical energy, which consists in rotating a non-conducting body continuously in one direction in proximity to an inductor continuously charged with energy of one polarity only, inducing on a rotating surface a development of electrical energy of one polarity only, and collecting the electricity so developed.

2. The method of developing static electricity, which consists in rotating a body continuously in one direction in proximity to a charged inductor, and causing on the body a development of static electricity of one polarity, without reversal of polarity during the rotation.

3. The method of developing static electricity, which consists in moving a non-conducting body in one direction near an inductor of one polarity, and a second body near an inductor of opposite polarity, thereby developing by induction in each case electrical energy of opposite polarity from that of the inductors, collecting from each of the moving bodies electrical energy developed at its surface, and conveying a part of the energy from each moving body to its proper terminal, and another portion to the inductor of the other moving body.

4. The method of developing static electricity, which consists in moving a non-conducting surface continuously in one direction in proximity to an inductor of one polarity, and a second similar surface in similar manner in proximity to a second inductor of opposite polarity, developing electrical energy by induction, and collecting from the moving surface of the one body electrical energy of one polarity only, and from the other body energy of opposite polarity only.

In testimony whereof I affix my signature in presence of two witnesses.

ROME V. WAGNER.

Witnesses:
CHAS. K. DAVIES,
PAUL B. MCFARLAND.